June 24, 1958  J. F. TAPLIN  2,840,094
SPEED CONTROL SYSTEM
Filed Aug. 1, 1955  2 Sheets-Sheet 1
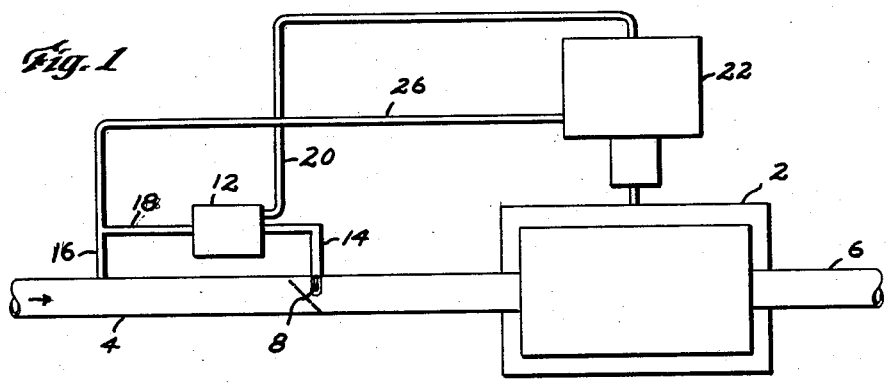
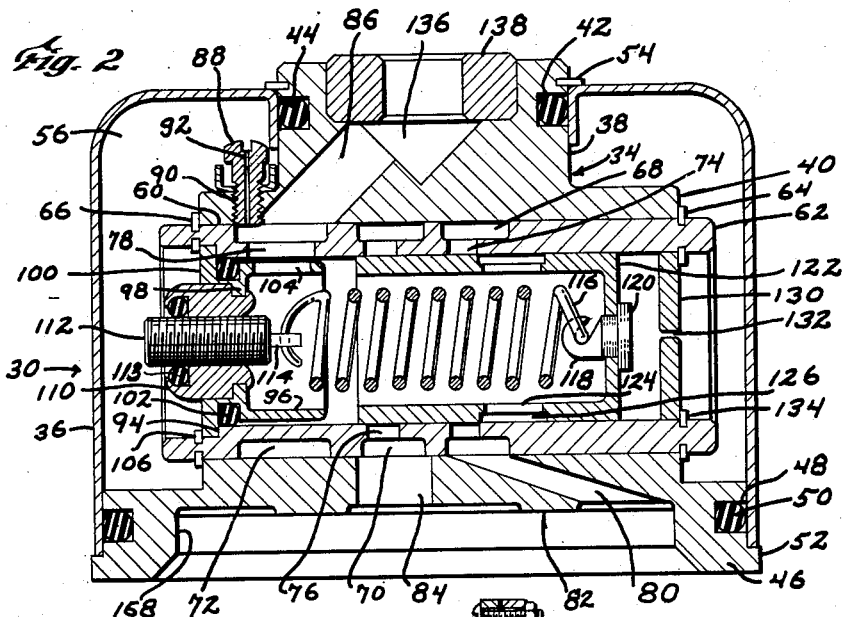
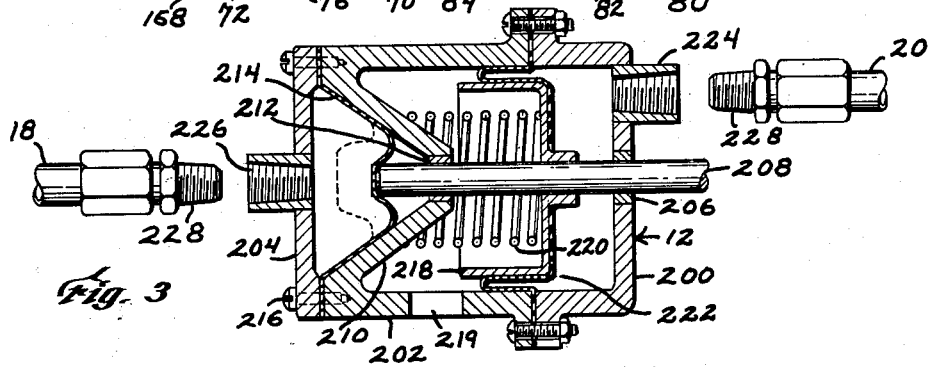
John F. Taplin
Inventor
by Campbell, Brumbaugh, Free & Graves
his Attorneys

United States Patent Office 2,840,094
Patented June 24, 1958

2,840,094

SPEED CONTROL SYSTEM

John F. Taplin, West Newton, Mass., assignor to Fairchild Engine and Airplane Corporation, Bayshore, N. Y., a corporation of Maryland Application August 1, 1955, Serial No. 525,760

11 Claims. (Cl. 137—29)

The present invention relates to speed responsive apparatus, and, more particularly, to a system for controlling the speed of prime movers, wherein variations in loading or supply pressure conditions are automatically compensated.

In accordance with the invention, a speed control system is provided for a prime mover, which may comprise a pressure responsive throttle actuator and a governor for controlling said throttle actuator, in which means are provided for causing the system to operate satisfactorily despite variations in the loading pressure of the system. For example, in a speed control system for a prime mover, such as an air turbine, in which the amount of power developed is dependent upon the position of a throttle in a conduit feeding air or other gas to the prime mover from a high pressure supply upstream of the throttle, the pressure responsive throttle actuator may be adapted to operate to a small degree at high loading pressures and to a larger degree at low loading pressures for a given change in the control pressure which is supplied to it by a governing mechanism. The governing mechanism is adapted to rapidly adjust operation of the throttle actuator when the speed of the prime mover strays from the predetermined value, whereby the speed of the prime mover is restored to the predetermined value, and the transient period for adjusting to the new conditions is of short duration. The pressure responsive throttle actuator is preferably of a novel design having a first diaphragm responsive to an applied control pressure and a second diaphragm of variable area responsive to a loading pressure, the second diaphragm of variable area being adapted to function as a mechanical spring having a stiffness proportional to the value of the loading pressure.

For a more complete understanding of the invention, reference may be had to the following detailed description taken in conjunction with the accompanying figures of the drawing, in which:

Figure 1 schematically illustrates a prime mover and a speed control system therefor constructed according to the present invention;

Fig. 2 is a sectional view, taken substantially through the center line thereof, of the spinner assembly of a governor constructed according to this invention;

Fig. 3 is a sectional view, taken substantially through the center line thereof, of a pressure responsive throttle actuator constructed as described hereinafter.

Figure 4:
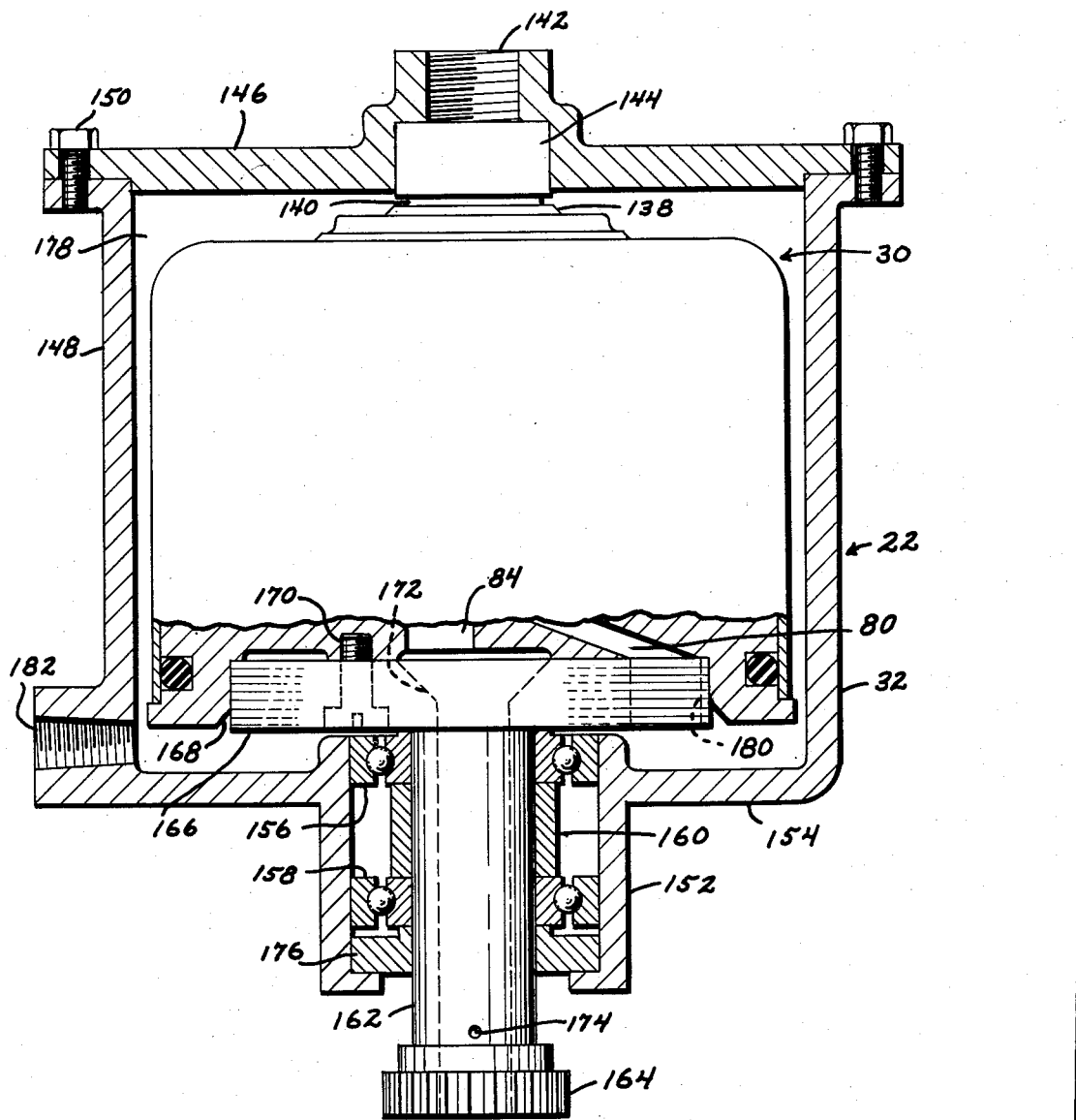
Fig. 4 is a sectional view of a pressure casing having rotatably mounted therein the spinner assembly of Fig. 2, said spinner assembly being supported on a drive shaft carried by said pressure chamber and rotatable relative thereto.

Referring first to Fig. 1 there is shown a prime mover 2, e. g. a gas or air turbine, and a pressure control system therefor constructed in accordance with the present invention. Turbine 2 is supplied with air or gas through a conduit 4 and exhaust gases are removed by a conduit 6. Conduit 4 may be connected to any suitable supply of air or other gas and because of the design of the speed control system to be hereinafter described the supply may be at a constant pressure or at a variable pressure without effecting the accuracy of the response of the system.

Since the output of the turbine is a function of the rate at which air or gas is supplied to it through conduit 4, the speed control system is designed to control the flow of gas or air to the turbine through conduit 4. For this purpose a throttle valve, schematically illustrated at 8 in Fig. 1, may be interposed in conduit 4 and supported on a suitable shaft adapted to be oscillated by an actuator 12 acting through suitable mechanical connections schematically illustrated at 14.

Actuator 12 is a pressure responsive device and is connected on one side to conduit 4 through conduits 16 and 18 and on the other side by conduit 20 to the control pressure output of a governor designated generally at 22. Actuator 12 is controlled by the pressure differential resulting thereacross by the application of fluid pressure through conduits 16 and 18 on one side and conduit 20 on the other. Governor 22 is affixed or otherwise connected for rotation with a drive shaft of prime mover 2. Governor 22 is also connected through conduits 16 and 26 to conduit 4 so that it is supplied with air at the same pressure as the air supplied to actuator 14. The pressure supplied to actuator 14 and governor 22 is called the loading pressure and may be either equal or proportional to the supply pressure, i. e. the pressure of the fluid supplied to prime mover 2 upstream of throttle valve 8. The exact details of construction of actuator 14 and governor 22 will be described hereinafter.

For purposes of describing the speed control system generally, it suffices to state that governor 22 operates to immediately translate changes in speed of turbine 2, to changes in control pressure, i. e. the pressure of the gas supplied to actuator 12 by way of conduit 20 and does so with a minimum of oscillation about the desired operating pressure to be supplied to actuator 12. Actuator 12, as explained hereinafter, is designed to move throttle 8 in accordance with changes in control pressure so as to modify the quantity of gas supplied to the prime mover and thus restore the speed of the prime mover to the desired value.

By virtue of its construction the actuator is adapted to compensate for changes in upstream supply pressure conditions as reflected by corresponding changes in the loading pressure applied to it through conduits 16 and 18, so that the accuracy of response of the speed control system is for all practical purposes completely independent of transients in supply pressure and will work equally well through a range of supply pressures.

Details of the governor and the actuator follow hereinafter.

Referring now to Figs. 2 and 4, the governor 22 comprises a spinner assembly 30 rotatably mounted within a pressure casing 32 which, when the governor is connected into the system of Fig. 1, is held stationary. Preferably casing 32 is secured by conventional means, e. g. bracket elements, to the housing of prime mover 2.

The spinner assembly 30 comprises a rotor 34 carrying a cylindrical housing 36. Rotor 34 has a reduced head section 38 formed integral with a large body portion 40. Head section 38 has a peripheral groove 42 for accommodating a resilient sealing member 44. At its bottom end body portion 40 terminates in a flange portion 46 having an annular groove 48 for receiving a sealing member 50 and a peripheral lip 52 upon which rests the bottom edge of housing 36. A retaining element 54 carried by head section 38 maintains housing 36 in place on the rotor. The sealing elements 44 and 50 cooperate to seal the expansion chamber 56 formed between rotor 34 and housing 36.

Body portion 40 has a cylindrical bore 60 running at right angles to the axis of rotation of the spinner. Mounted within bore 60 is a hollow cylinder or sleeve 62. Bore 60 and sleeve 62 are machined to provide a tight fit therebetween. Cylinder 62 is held in place and sealed with respect to bore 60 by retaining elements 64 and 66 which fit in exterior circumferential grooves at opposite ends of the cylinder. The hollow cylinder 62 has three exterior circumferential grooves 68, 70 and 72. Groove 68 communicates with the interior of the cylinder by means of a radial passageway 74. Similar radial passageways 76 and 78 are provided for grooves 70 and 72 respectively.

Groove 68 communicates with an inclined bore 80 in body 40. Inclined bore 80 terminates in the recessed face 82 of body portion 40 a substantial radial distance from the axis of rotation so as to be subject to maximum centrifugal slinging or cleaning action whereby particles of dirt will be dispelled therefrom. Groove 70 communicates with a vertical bore 84 which also terminates in face 82. Groove 72 communicates with an inclined passageway 86 formed in head section 38 and body 40. A screw 88 is mounted in a vertical tapped opening 90 in body 40. Opening 90 communicates with inclined passageway 86. Screw 88 has a restricted axial opening 92 through which pressure in groove 72 and passageway 86 may bleed.

The interior diameter of sleeve 62 is slightly larger at one end to form an annular shoulder 94. Secured in sleeve 62 is a cylindrical collar 96 having an interior flange 98, an exterior flange 100, and a groove intermediate flanges 98 and 100 for receiving a sealing element 102. Collar 96 also has a radial opening 104 communicating with radial passageway 78 in sleeve 62. Exterior flange 100 abuts shoulder 94, and a retaining ring 106 positioned in an interior groove in sleeve 62 holds collar 96 in place in the cylinder. Secured in position in the central opening of collar 96 is a cylindrical screw support 110. Screw support 110 has an annular groove on its inner end in which resides interior flange 98 of collar 96. The groove and flange cooperate to hold the two elements together and to provide a fluid seal therebetween.

Screw support 110 has a central opening threaded to receive a solid screw member 112 provided with exterior threads. The outer end of screw support 110 has an annular groove in which resides a sealing element 113 for providing a fluid seal between the support 110 and the screw member 112. At its inner end screw member 112 has an extension 114 provided with an opening for receiving the end of a spring 116. At its opposite end spring 116 is connected to the hooked extension 118 of a plug 120 secured in the head of a piston 122. Piston 122 is slidably positioned in sleeve 62 and has two or more radial ports 124 which communicate with a circumferential groove 126 in its exterior surface. The governor is subject to adjustment by means of screw member 112 which will vary the tension of spring 116 for any given speed of rotation. The centrifugal force developed by the piston is equal to the force of the restraining spring at the controlled rotational speed.

The center of gravity of piston 122 is on that side of the center line of rotation of the spinner assembly at which is instantaneously located the closed end or head of the piston, i. e. to the right of the axis of rotation of the spinner assembly as seen in Fig. 2. When the governor is started up, the centrifugal force created in piston 122 will tend to shift it away from collar 96 because the center of gravity of the piston is to one side of the axis of roation. As the centrifugal force increases, the piston overcomes the force of spring 116 and will continue to move away from collar 96; it may continue in this direction until arrested by circular plug 130 having a damping orifice 132 secured in place in cylinder 62 and sealed off by elements 134. As the speed of rotation of the spinner assembly is gradually decreased piston 122 will gradually move back in the direction of the axis of rotation due to the action of spring 116.

Head section 38 has a central bore 136 drilled therein and communicating with inclined passageway 86. A collar member 138 surrounds said bore 136 and provides a bearing surface for receiving a conventional conduit element 140 (Fig. 4), for connecting bore 136 with the takeoff port 142 or pressure casing 32. Conduit element 140 makes a sliding connection with takeoff port 142 through a conventional seal 144 which is secured to pressure casing 32 and hence does not rotate with the spinner assembly.

Pressure casing 32 comprises a head section 146 provided with takeoff port 142 and a cylindrical body section 148 secured to the head section by means of bolts 150. Body section 148 is provided with a cylindrical extension 152 surrounding a central opening in its closed end 154. Positioned within extension 152 by means of ball bearing elements 156 and 158 spaced from each other by a spacer 160 is a hollow drive shaft 162 provided with a gear element 164 at its bottom end whereby said shaft may be driven by a drive shaft associated with the prime mover whose speed is to be controlled. Integral with the upper end of drive shaft 162 is a circular plate 166 which is of size sufficient to fit snugly in the circular recess 168 formed in the rotor 34 by flange section 46. A screw 170 received by a tapped opening in face 82 of body portion 40 of the rotor provides a driving connection between shaft 162 and the spinner assembly. Plate 166 has a central opening 172 that connects bore 84 with the internal passageway provided in shaft 162. An opening 174 is provided in drive shaft 162 just beyond a sealing member 176 to connect bore 84 and the internal passageway of shaft 162 with the atmosphere. Sealing member 176 cooperates with sealing member 144 to render the chamber 178 formed between casing 32 and the spinner assembly pressure tight.

Plate 166 has a second opening 180 that communicates with inclined bore 80 and permits passage of gas therethrough from the chamber 178. Casing 32 is provided with a port 182 that is adapted to receive a suitable fitting secured to the conduit 26 leading from the supply conduit 4.

Operation of the governor when connected in the system of Fig. 1 with the prime mover 2 in operation is as follows:

The prime mover 2 operates at a speed determined by the quantity of air or other gas being supplied to it through conduit 4. Assuming now for purposes of explanation that the speed of the prime mover drops below the value at which it is to be maintained because of an increase in its load, piston 122 will move to the left from the position in which it is shown in Fig. 2. Its movement to the left results from its centrifugal force at the reduced speed being insufficient to overcome spring 116. As the piston moves to the left its radial ports 124 and its circumferential channel 126 come into registration with passageway 74 and circumferential groove channel 68 of cylinder 62. When this occurs loading pressure is supplied to the interior of cylinder 62 from chamber 178 by way of the opening 180 in plate 166, inclined passageway 80, channel 68, passageway 74, channel 126 and passageway 124. At the same time piston 122 overlies passageway 76 so that the pressure within cylinder 62 cannot be vented to the atmosphere through channel 70, bore 84, the interior of drive shaft 162, and opening 174. The resulting increase in pressure within cylinder 62 is transmitted through openings 104 and 78, inclined passageway 86, central bore 136, and exit port 142 to conduit 20 which in turn transmits the increased pressure to one side of actuator 12. The pressure in line 20 is the actuator control pressure. Simultaneously the pressure in cylinder 62 bleeds through constriction 92 to slowly equalize the pressure in chamber 56. The pressure in cylinder 62 reacts on the closed end of piston 122 through damping orifice 132. The damping orifice 132 is small enough to prevent rapid oscillation of the piston as the pressure changes. The volume between the head of piston 122 and the plug member 130 is kept to a minimum value in order to maximize the damping effect. In a steady state, i. e. when the system is in equilibrium, the pressures on the opposite sides of the piston head will be the same.

As explained hereinafter, when the control pressure output of the governor applied to actuator 12 through conduit 20 increases in value, the actuator operates to open throttle 8 to increase the rate of flow of air or gas to the prime mover, whereby the speed of the latter is increased. As the prime mover increases speed, the spinner assembly rotates faster and the centrifugal force of piston 122 becomes sufficiently great to overcome spring 116. As the piston again moves to the right away from cylindrical collar 96 it reaches the position shown in Fig. 2. In the illustrated position both the vent and supply passages are blocked so that the pressure within cylinder 62 remains substantially constant so long as the piston does not move further to the right. If the centrifugal force of the piston is so great as to cause it to continue to move away from the axis of rotation of the spinner assembly, passageway 76 will eventually be no longer blocked by the piston and the pressure within cylinder 62 will be dumped to the atmosphere. This reduces the control pressure in conduit 20 with the result that actuator 12 then operates to close throttle 8. As throttle 8 closes, the supply of air to the prime mover is reduced. With a drop in the rate of flow of gas in conduit 4, the speed of the prime mover is correspondingly reduced. When this occurs the spinner also loses speed and the piston again commences to be drawn by spring 116 toward collar 96. Eventually the system is balanced off to maintain the desired speed and will remain in balance until the speed of the prime mover is caused to vary by a sudden increase or decrease in load or a change in the pressure of the supply air or gas traveling in conduit 4.

It is believed obvious from the foregoing description that the governor may be set to maintain the speed of the prime mover at any desired value. This is accomplished by adjusting screw 112 which operates to vary the tension in spring 116.

The actuator 12 illustrated in Fig. 3 comprises a cylindrical housing formed in three sections 200, 202 and 204. Section 200 has a central opening provided with an annular bearing collar 206, in which is slidably positioned a piston rod 208. Section 202 has a frusto-conical wall 210 extending inwardly from adjacent section 204. The apex of the frusto-conical wall 210 has a cylindrical opening provided with a bearing collar 212 through which extends piston rod 208. A conical diaphragm 214 is clamped at its periphery between sections 202 and 204 by means of bolts 216, and its central portion overlies in any suitable operatively coupled relation and is preferably secured to the end of piston 208. Also carried by piston rod 208 is a piston 218 having a spring 220 interposed between it and frusto-conical wall 210. Spring 220 urges piston 218 and rod 208 to the right of the housing, i. e. in the direction away from frusto-conical wall 210. Spring 220 may be omitted, if desired.

A second diaphragm 222 is secured at its periphery between sections 200 and 202 of the housing and at its central portion it overlies and is secured to piston 218. If desired, diaphragm 222 may be replaced by piston rings or any equivalent type of piston seal. A port 219 is provided in section 202 to vent the enclosed chamber formed between piston 218 and wall 210.

Sections 200 and 204 are provided with tapped ports 224 and 226 respectively for receiving suitable coupling elements 228 by which the actuator is connected to conduits 20 and 18 in the speed control system illustrated in Fig. 1. The loading pressure from conduit 4 enters port 226 of the actuator, and the control pressure from the governor enters the actuator through port 224. Consequently, movement of piston rod 208 is controlled by the differential pressure introduced by way of ports 224 and 226 and exerted on diaphragms 222 and 214. Diaphragm 214 operates in response to the loading pressure applied thereto to move piston rod 208 in opposition to the control pressure exerted on piston 218 and diaphragm 222.

Diaphragm 214 is made of conical shape so that it will function similarly to a mechanical spring with variable gradient; the spring gradient being directly proportional to the value of the loading pressure. Accordingly, diaphragm 214 is designated as a variable area loading diaphragm.

When the loading pressure applied through port 226 is small, the effective loading force acting on the variable area diaphragm is small and therefore produces a weak spring action. When the loading pressure is high, the effective loading force acting on the variable area diaphragm is great producing a stiff spring action. By using a variable area diaphragm the actuator is caused to move a small amount for a given change in governor pressure when the loading pressure is high and a substantially greater amount for the same given change in governor pressure when the loading pressure is low. Thus automatic compensation to position a main throttle valve in accordance with the upstream supply pressure conditions is provided. The reason for providing such automatic compensation is that when the air or gas pressure in conduit 4 is at a high value, the throttle valve 8 in conduit 4 must be moved only a small amount to result in a given amount of change in the gas flow as compared to when the supply pressure is low, in the latter case the throttle must be moved to a greater degree so that more of the low pressure supply air or gas can flow into the prime mover and will modify the speed thereof. In other words, the pressure of the air or gas in conduit 4 governs the rate at which it flows into the turbine past the throttle valve, and air or gas at low pressure requires the throttle valve to be opened or closed to a greater degree than air or gas at a higher pressure in order to effect the same quantitative change in prime mover speed. By using a variable area loading diaphragm the entire governor system is made to operate completely independent of large variations in the supply pressure and work satisfactorily and equally well with all supply pressures.

It is to be understood that the above described system is designed for use with compressible fluids and that the term "gas" as employed herein is intended to embrace all suitable compressible fluids including air.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

I claim:

1. A system for regulating the speed of a prime mover having a means for controlling the flow of fluid to the prime mover from a source of fluid under pressure, comprising a speed responsive means driven by the prime mover for producing a control pressure responsive to the speed of the prime mover and a differential pressure responsive means for actuating said flow controlling means responsive to said control pressure and variably responsive to a pressure proportionate to the pressure of the fluid from said source upstream of the flow controlling means whereby the actuating means operates the flow controlling means a small amount in response to a given change in said control pressure when the pressure proportionate to the upstream pressure is large and a large amount when the pressure proportionate to the upstream pressure is small.

2. A system for regulating the speed of a prime mover having a throttle valve for controlling the flow of fluid to the prime mover from a source of fluid under pressure, comprising a speed responsive means driven by the prime mover for producing a control pressure responsive to the speed of the prime mover and a differential pressure responsive throttle actuating means responsive to said control pressure and variably responsive to a pressure proportionate to the pressure of the fluid from said source upstream of the throttle valve, whereby the throttle valve actuating means causes a small movement of the throttle valve in response to a given change in said control pressure when the pressure proportionate to the upstream pressure is large and a large movement when the pressure proportionate to the upstream pressure is small.

3. A system for regulating the speed of a prime mover having a throttle valve for controlling the flow of fluid to the prime mover from a source of fluid under pressure, comprising a speed responsive means driven by the prime mover for producing a control pressure responsive to the speed of the prime mover and a differential pressure responsive throttle valve actuating means, having a first diaphragm of fixed effective area responsive to said control pressure and a second diaphragm of variable effective area responsive to a pressure proportionate to the pressure of the fluid from said source upstream of the throttle valve, for operating said throttle valve a small amount in response to a given change in said control pressure when the pressure applied to said variable area diaphragm is large and for operating said throttle valve a large amount when the pressure applied to said variable area diaphragm is small.

4. A system for regulating the speed of a prime mover having a throttle valve for controlling the flow of fluid to the prime mover from a source of fluid under pressure, comprising a speed responsive means driven by the prime mover for producing a control pressure responsive to the speed of the prime mover and a differential pressure responsive throttle valve actuating means having a fixed area diaphragm, a variable area diaphragm, and a shaft for controlling said throttle valve operatively coupled therebetween, said fixed area diaphragm being responsive to said control pressure and said variable area diaphragm being oppositely responsive to a pressure proportionate to the pressure of the fluid from said source upstream of the throttle valve.

5. A system for regulating the speed of a prime mover having a throttle valve for controlling the flow of fluid to the prime mover from a source of fluid under pressure, comprising a speed responsive means driven by the prime mover for producing a control pressure responsive to the speed of the prime mover, a differential pressure responsive throttle valve actuating means having a fixed area diaphragm, a variable area diaphragm and a shaft operatively coupled therebetween and adapted to be mechanically connected to the throttle valve, the effective area of said variable area diaphragm varying according to the position of said shaft, means for applying said control pressure to said fixed area diaphragm and means for oppositely loading said variable area diaphragm with a pressure proportional to the pressure of the fluid from said source upstream of said throttle valve.

6. A system for regulating the speed of a prime mover having a throttle valve for controlling the flow of fluid to the prime mover from a source of fluid under pressure, comprising a speed responsive means driven by the prime mover for producing a control pressure responsive to the speed of the prime mover, differential pressure responsive throttle valve actuating means having a shaft adapted to be mechanically connected to the throttle valve, a first pressure barrier of fixed effective area fixedly coupled to said shaft, a second pressure barrier of variable effective area operatively coupled to said shaft at a point removed from said first pressure barrier, the effective area of said second pressure barrier varying according to the position of said shaft, means for applying said control pressure to said first pressure barrier, and means for loading said second variable area pressure barrier with a pressure proportional to the pressure of the fluid from said source upstream of said throttle valve.

7. A system for regulating the speed of a prime mover having a throttle valve for controlling the flow of fluid to the prime mover from a source of fluid under pressure, comprising a speed responsive means having a pressure modulating rotor driven by the prime mover for producing a control pressure responsive to the speed of said prime mover and a differential responsive throttle valve actuating means responsive to said control pressure and variably responsive to a pressure proportionate to the pressure of the fluid from said source upstream of the throttle valve, wherein for a given change in said control pressure said actuating means operates to change the position of said throttle valve a large amount when said upstream pressure of the fluid is at a low value and to move said throttle valve a proportionately smaller amount when said upstream fluid is at a higher value.

8. A system for regulating the speed of a prime mover having a throttle valve for controlling the flow of fluid to the prime mover from a source of fluid under pressure, comprising a governor driven by a prime mover for producing a control pressure responsive to the speed of said prime mover and a differential pressure responsive throttle valve actuating means responsive to said control pressure and variably responsive to a pressure proportionate to the pressure of the fluid from said source upstream of said throttle valve, said governor comprising a rotor having means defining a chamber in said rotor running at right angles to its axis of rotation, said chamber defining means having a supply pressure inlet port, a vent port, and an outlet port, valve means slidably positioned within said chamber, said valve means being influenced by the centrifugal force generated by said rotor as it rotates to close said inlet port and open said vent port to the interior of said chamber when the rotational speed of said rotor drifts above a predetermined value and to open said inlet port and close said vent port to the interior of said chamber when the speed of said rotor drifts below said predetermined value, means associated with said inlet port for supplying fluid thereto at a pressure proportional to the pressure of the fluid from said source upstream of the throttle valve, and means associated with said outlet port for picking off the pressure in said chamber as modulated by said valve means in said chamber and directing said modulated pressure as said control pressure.

9. A governor for use with a prime mover having a throttle valve for controlling the flow of fluid to the prime mover from a source of fluid under pressure and a pressure responsive actuator for controlling the position of said throttle valve, said governor comprising a rotor having means defining a chamber in said rotor running at right angles to its axis of rotation, said chamber defining means having a supply pressure inlet port, a vent port, and an outlet port, valve means slidably contained within said chamber, said valve means being responsive to the centrifugal force generated by said rotor as it rotates to close said inlet port and open said vent port to the interior of said chamber when the rotational speed of said rotor drifts above a predetermined value and to open said inlet port and close said vent port to the interior of said chamber when the speed of said rotor drifts below said predetermined value, means associated with said inlet port for supplying fluid thereto at a pressure proportional to the pressure of the fluid from said source upstream of the throttle valve.

10. A governor for use with a prime mover having a throttle valve for controlling the flow of fluid to the prime mover from a source of fluid under pressure and a pressure responsive actuator for controlling the position of said throttle valve, said governor comprising a rotor having means defining a chamber in said rotor running at right angles to its axis of rotation, said chamber having a supply pressure inlet port, a vent port, and an outlet port, piston means slidably contained within said chamber and biased in opposition to the centrifugal force exerted thereon by spring means contained within said chamber, said piston means being adapted to close said inlet port and open said vent port to the interior of said chamber when the rotational speed of said rotor drifts above a predetermined value and to open said inlet port and close said vent port to the interior of said chamber when the speed of said rotor drifts below said predetermined value, means associated with said inlet port for supplying fluid thereto at a pressure proportional to the pressure of the fluid from said source upstream of the throttle valve, means associated with said outlet port for picking off the pressure in said chamber as modulated by said valve means in said chamber and directing said modulated chamber to said actuator means, means defining an expansion chamber associated with said rotor, bleeder means for conducting the pressures within said rotor chamber to said expansion chamber, and means applying the pressure in said expansion chamber to said piston in opposition to the pressure within said rotor chamber.

11. A governor means for providing a control pressure responsive to the speed of a prime mover, comprising a spinner body adapted to be mechanically connected to said prime mover so as to rotate at a speed proportional to the speed of said prime mover, means for supplying gas under pressure to said body, and means for conducting a speed responsive output control pressure from said body for application to a pressure responsive actuator, said spinner body comprising a chamber running at right angles to its axis of rotation and having an inlet port communicating with said means for supplying fluid under pressure to said body, an outlet port communicating with said means for conducting a speed responsive output control pressure from said body and a vent port, a hollow cylindrical piston slidably positioned in said chamber having its center of gravity eccentric to the axis of rotation of said spinner body, said piston being closed at one end and having an opening therein which when brought into registration with said inlet port as said piston moves in said chamber permits fluid to flow into said chamber through said inlet port, means biasing said piston in opposition to the centrifugal force generated by said spinner body whereby it returns said piston toward said axis of rotation as the speed of said body is decreased, means associated with said piston for closing said inlet port and opening said vent port as said piston moves away from said axis of rotation and for opening said inlet port and closing said vent port as said piston approaches said axis of rotation, said piston cooperating with said inlet and vent ports to control the introduction and removal of fluid from said chamber whereby to modulate the pressure within said chamber in a direction opposite to the direction of change of the speed of said spinner body, means defining an expansion chamber exterior of said spinner body, means for bleeding pressure from said chamber in said body to said expansion chamber, and means for applying pressure in said expansion chamber to said piston in opposition to the pressure exerted on said piston within said chamber in said body whereby to dampen an oscillatory movement of said piston.

References Cited in the file of this patent

UNITED STATES PATENTS

| | | |
|---|---|---|
| 971,583 | Bell | Oct. 4, 1910 |
| 1,077,472 | Hofmann | Nov. 4, 1913 |
| 2,447,779 | Taplin | Aug. 24, 1948 |